United States Patent
Tateiwa

(10) Patent No.: US 10,808,620 B2
(45) Date of Patent: Oct. 20, 2020

(54) AIRCRAFT, ENGINE PYLON OF AIRCRAFT, AND METHOD FOR MOUNTING ENGINE TO AIRFRAME OF AIRCRAFT

(71) Applicant: MITSUBISHI AIRCRAFT CORPORATION, Aichi (JP)

(72) Inventor: Jingo Tateiwa, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 1138 days.

(21) Appl. No.: 14/620,703

(22) Filed: Feb. 12, 2015

(65) Prior Publication Data

US 2015/0239581 A1 Aug. 27, 2015

(30) Foreign Application Priority Data

Feb. 24, 2014 (JP) .................................. 2014-033263

(51) Int. Cl.
*B64D 27/26* (2006.01)
*F02C 7/20* (2006.01)
(Continued)

(52) U.S. Cl.
CPC ................ *F02C 7/20* (2013.01); *B64D 27/26* (2013.01); *B64D 33/08* (2013.01); *B64F 5/50* (2017.01);
(Continued)

(58) Field of Classification Search
CPC ..... F02C 7/20; B64D 27/26; B64D 2027/262; F05D 2240/90
See application file for complete search history.

(56) References Cited

U.S. PATENT DOCUMENTS

| 863,887 A * | 8/1907 | Stuttle ..................... F16L 21/06 |
| | | 285/373 |
| 2,712,456 A * | 7/1955 | McCreery ........... F01N 13/1811 |
| | | 285/145.5 |

(Continued)

FOREIGN PATENT DOCUMENTS

| EP | 2784404 A1 * | 10/2014 | .......... F24F 13/0209 |
| JP | 2009275949 A | 11/2009 | |

OTHER PUBLICATIONS

Japanese Office with translation for corresponding Japanese Application No. 2014-033263 dated Sep. 4, 2017.

*Primary Examiner* — Michael H Wang
(74) *Attorney, Agent, or Firm* — Pearne & Gordon LLP

(57) ABSTRACT

An aircraft includes an accessory member that constitutes an engine accessory, the accessory member being arranged between an aircraft engine pylon and an engine, in an attached state to an attachment base member that is at least one of the pylon and the engine. The accessory member includes: a surrounding portion that surrounds at least an end portion of a tubular body connected to the accessory member; and a projecting portion that projects from the end portion of the tubular body. The entire accessory member including the surrounding portion and the projecting portion is divided so as to be separable to a left side and a right side of the pylon, and the accessory member is attachable to and detachable from the attachment base member by accessing an outer periphery of the tubular body from the left side and the right side of the pylon without removing another member.

7 Claims, 5 Drawing Sheets

(51) Int. Cl.
 *B64D 33/08* (2006.01)
 *F01D 25/28* (2006.01)
 *B64F 5/50* (2017.01)

(52) U.S. Cl.
 CPC ........ *F01D 25/285* (2013.01); *F05D 2240/90* (2013.01); *Y10T 29/49231* (2015.01)

(56) References Cited

U.S. PATENT DOCUMENTS

| | | | | |
|---|---|---|---|---|
| 2,752,173 A * | 6/1956 | Krooss | .................... | F16L 17/04 285/129 |
| 4,441,723 A * | 4/1984 | Greenwald | ........... | B29C 43/027 277/618 |
| 4,471,979 A * | 9/1984 | Gibb | ........................ | F16L 17/00 285/373 |
| 4,639,020 A * | 1/1987 | Rung | ....................... | F16L 17/00 285/367 |
| 5,123,242 A * | 6/1992 | Miller | ........................ | F02C 7/14 165/300 |
| 5,378,028 A * | 1/1995 | Issagholian-Havai | ....................... | F16L 25/00 285/331 |
| 5,540,465 A * | 7/1996 | Sisk | ...................... | F16L 17/025 285/365 |
| 5,729,969 A * | 3/1998 | Porte | ......................... | F02C 6/08 60/226.1 |
| 5,782,077 A * | 7/1998 | Porte | ....................... | F02C 7/185 165/154 |
| 6,202,403 B1 * | 3/2001 | Laborie | .................. | B64D 33/08 60/39.83 |
| 7,200,999 B2 * | 4/2007 | Bagnall | .................... | B64C 21/06 60/226.1 |
| 7,520,465 B2 * | 4/2009 | Mahjoub | .................... | B64C 7/00 165/44 |
| 7,607,308 B2 * | 10/2009 | Kraft | ........................ | F02C 6/08 60/226.1 |
| 7,861,513 B2 * | 1/2011 | Stretton | .................... | B64C 7/02 60/226.1 |
| 7,926,261 B2 * | 4/2011 | Porte | ....................... | B64D 13/06 60/226.1 |
| 8,061,649 B2 * | 11/2011 | Journade | ................ | B64D 27/26 244/54 |
| 8,522,529 B2 * | 9/2013 | Martinou | ............... | B64D 13/08 244/57 |
| 2007/0245711 A1 | 10/2007 | Stretton | | |
| 2009/0188234 A1 | 7/2009 | Suciu et al. | | |
| 2013/0174934 A1 * | 7/2013 | Duffy | ................ | F24F 13/0209 138/149 |
| 2013/0239584 A1 * | 9/2013 | Suciu | ..................... | F01D 15/08 60/792 |

* cited by examiner

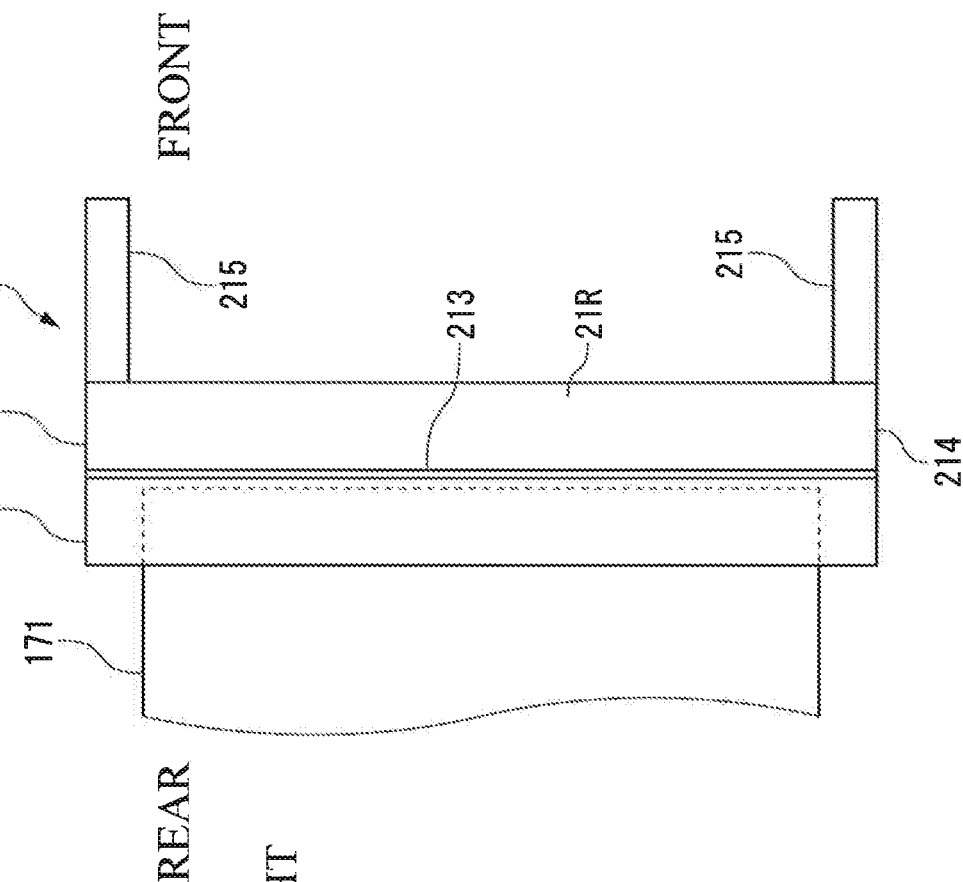
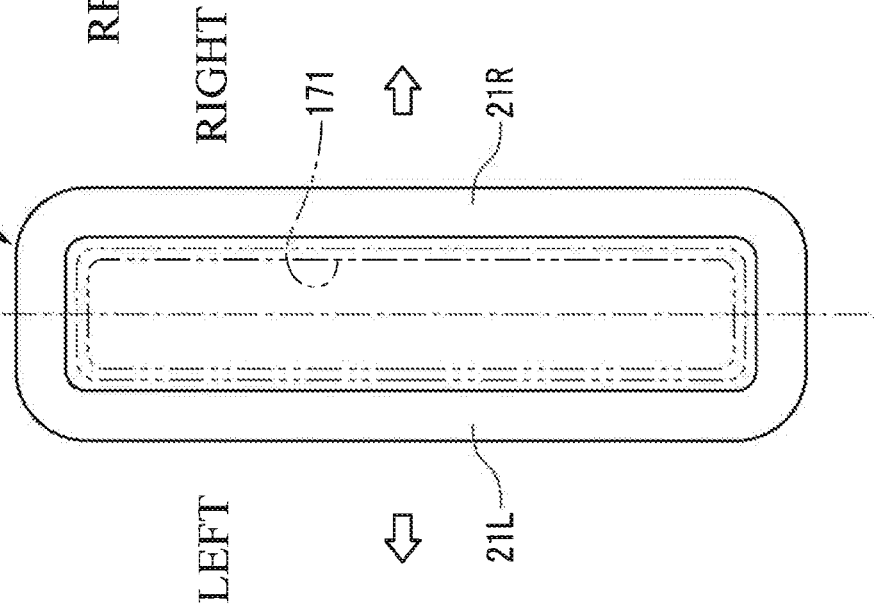

AIRCRAFT, ENGINE PYLON OF AIRCRAFT, AND METHOD FOR MOUNTING ENGINE TO AIRFRAME OF AIRCRAFT

BACKGROUND OF THE INVENTION

Field of the Invention

The present invention relates to an aircraft, an engine pylon of an aircraft, a method for mounting an engine to an airframe of an aircraft, and a method for manufacturing an aircraft.

Description of the Related Art

An engine of aircraft is supported on an airframe (a main wing) via a pylon (e.g., U.S. Patent Application Publication No. 2007/0245711).

When the engine is mounted to the main wing, a nacelle and a fairing that cover the engine are opened, and the engine is carried to a position below the pylon provided on the main wing by a hand truck. The engine is suspended, and fixed to the pylon by using fasteners and tools.

Various accessories are collected and arranged between the pylon that is a structure on the airframe side and the engine. The accessories are attached to the engine or the pylon.

Due to the existence of the accessories, when the engine is mounted to the pylon, it is not possible to ensure a work space, into which the fasteners and the tools are inserted and in which the tools are moved, between the pylon and the engine or in the vicinity thereof in some cases.

In this case, a space required for the work can be formed by removing a member (for example, a duct) constituting the accessories from the pylon or the engine. However, it becomes necessary to perform a returning work of attaching the accessory member to the pylon or the engine after removing the accessory member and mounting the engine. It is not desirable that the returning work takes a great deal of time.

For example, when a duct of a heat exchanger around which fuel, hydraulic, engine bleed air pipes or the like are arranged is removed and returned after mounting the engine, the returning work takes a great deal of time. In order to remove the duct of the heat exchanger, it is also necessary to remove peripheral pipes. Thus, the peripheral pipes are formed in a removable divided structure.

After removing the peripheral pipes, the duct of the heat exchanger is removed, and the engine is mounted. The duct of the heat exchanger is then attached to an original position, and the peripheral pipes are also attached to original positions. Accordingly, it becomes necessary to perform a lot of returning works.

Based on the above problems, an object of the present invention is to provide an aircraft in which it is possible to mount an engine to an airframe with high work efficiency while ensuring a required work space, and a method for mounting an engine to an airframe of an aircraft.

SUMMARY OF THE INVENTION

As a result of study in view of reducing a returning work as much as possible based on a layout of accessory members between a pylon and an engine, and a handling path of tools, the present inventors found an accessory member that overlaps with the handling path of the tools with no other member or pipe arranged therearound. The accessory member is a frame-shaped member that is provided at a distal end of a duct of a heat exchanger. The member is attached to the duct while surrounding the distal end of the duct.

However, there is a fan case immediately next to the distal end of the duct of the heat exchanger. There is not a sufficient space for inserting the frame-shaped member between the distal end of the duct of the heat exchanger and the fan case after completing mounting of the engine. In this case, it is not possible to surround the distal end of the duct by the frame-shaped member by inserting the distal end of the duct into an inner side of the frame-shaped member. Thus, the frame-shaped member cannot be attached to the duct.

The present invention which has been accomplished in view of the above points is an aircraft including an accessory member that constitutes an engine accessory, the accessory member being arranged between a pylon that is used for supporting an engine on an airframe and the engine, in an attached state to an attachment base member that is at least one of the pylon and the engine, wherein the accessory member includes a surrounding portion that surrounds at least an end portion of a tubular body connected to the accessory member, and a projecting portion that projects from the end portion of the tubular body, the entire accessory member including the surrounding portion and the projecting portion is divided so as to be separable to a left side and a right side of the pylon, and the accessory member is attachable to and detachable from the attachment base member by accessing an outer periphery of the tubular body from the left side and the right side of the pylon without removing another member.

In the present invention, the left and the right of the pylon correspond to the left and the right of the airframe of the aircraft.

In the present invention, since the accessory member is attachable to and detachable from the attachment base member, an engine mounting work can be performed after previously removing the accessory member from the attachment base member. When the accessory member is removed, an extra space is left between the pylon and the engine corresponding to the projecting portion of the accessory member that does not overlap with the tubular body. It is thus possible to ensure a work space for handling tools or the like.

Even if there is not a sufficient space required for inserting the end portion of the tubular body into an inner side of the surrounding portion of the accessory member when the accessory member is attached to the attachment base member after mounting the engine, the outer periphery of the tubular body can be surrounded by divided parts of the accessory member from the right and left sides of the pylon, and the accessory member can be thereby attached to the attachment base member.

In the present invention, since it is possible to access the outer periphery of the tubular body from the left side and the right side of the pylon without removing another member, it is not necessary to perform a work of removing another member at the time of forming the work space by removing the accessory member from the attachment base member.

Therefore, it is only necessary to reattach the accessory member removed from the attachment base member after mounting the engine, so that the man-hours of a returning work can be reduced.

As a result, it is possible to mount the engine to the airframe with high work efficiency while ensuring a required work space.

In the present invention, at least one portion of the tubular body is preferably formed in a bellows shape.

Accordingly, the space generated by removing the accessory member is widened by contracting the bellows of the tubular body. It is thus possible to sufficiently ensure a work space required for mounting the engine.

In the present invention, the engine may be a turbofan engine including an engine body and a fan, the engine accessory may be a heat exchanger that is arranged between the pylon and the engine body and uses air flowing out of the fan as a heat source, and at least the end portion of the tubular body constituting the heat exchanger may be surrounded by the surrounding portion.

In the present invention, a first heat exchanger as the heat exchanger, and a second heat exchanger that uses air flowing out of the fan as a heat source may be longitudinally arranged between the pylon and the engine body, and the end portion of the tubular body constituting the first heat exchanger or the second heat exchanger may be surrounded by the surrounding portion on at least one of a front side and a rear side of the pylon.

The front and the rear in the present invention mean the front and the rear of the airframe of the aircraft.

In the above configuration, as compared to a case in which one heat exchanger is arranged between the pylon and the engine, a space between the pylon and the engine becomes small, and the work space for mounting the engine to the pylon tends to be insufficient on the front side or the rear side of the pylon. Therefore, the accessory member of the present invention can be preferably used.

When the above heat exchanger includes the tubular body facing the fan, the end portion of the tubular body is preferably surrounded by the surrounding portion of the accessory member.

When the tubular body facing the fan is located close to the fan, there is not a sufficient space required for inserting the tubular body into the inner side of the surrounding portion of the accessory member and surrounding the end portion of the tubular body by the surrounding portion. Therefore, the accessory member of the present invention can be preferably used.

The present invention is also an engine pylon that is used for supporting a turbofan engine including an engine body and a fan on an airframe of an aircraft, wherein the pylon supports two heat exchangers that are longitudinally arranged between the pylon and the engine body and use air flowing out of the fan as a heat source, the accessory member of the above aircraft is attached to the pylon, the heat exchanger arranged on a front side out of the two heat exchangers has the tubular body facing the fan, and at least a front end of the tubular body is surrounded by the surrounding portion of the accessory member.

The present invention can be also applied to a method for mounting an engine to an airframe of an aircraft by using the above accessory member.

The method for mounting an engine to an airframe of an aircraft of the present invention includes the steps of: mounting the engine to the pylon with the above accessory member of the aircraft previously removed from the attachment base member; and surrounding the outer periphery of at least the end portion of the tubular body by the accessory member from the left side and the right side of the pylon and attaching the accessory member to the attachment base member after completing the mounting of the engine.

The present invention is also applied to a method for manufacturing an aircraft through the above respective steps.

In accordance with the present invention, it is possible to mount the engine to the airframe of the aircraft with high work efficiency while ensuring a required work space.

BRIEF DESCRIPTION OF THE DRAWINGS

FIGS. 4A and 4B are schematic views illustrating the intake port frame; and

DETAILED DESCRIPTION OF THE PREFERRED EMBODIMENT

In the following, an embodiment of the present invention is described by reference to the accompanying drawings.

Figure 1:
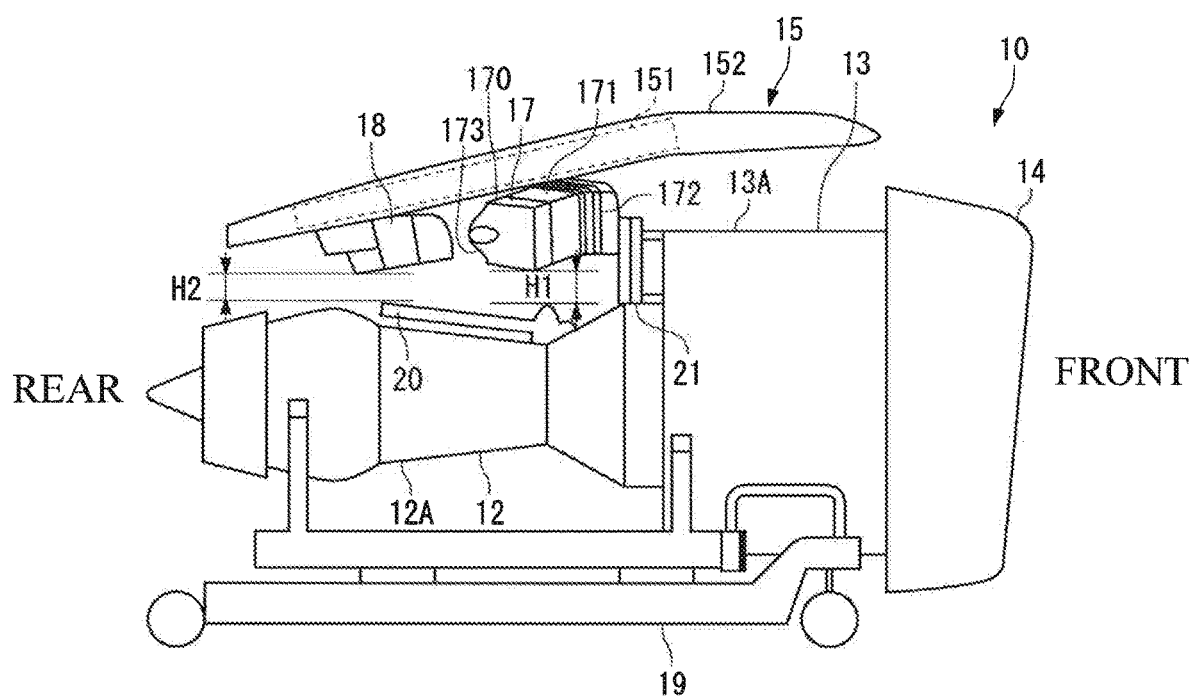
FIG. 1 is a view illustrating a turbofan engine (a left-side engine) that has not been mounted to a pylon yet.

An aircraft according to the embodiment of the present invention includes a turbofan engine 10 shown in FIG. 1.

The turbofan engine 10 is supported on a lower side of a main wing (not shown) via a pylon 15.

The turbofan engine 10 includes an engine body 12, and a fan 13 that is arranged ahead of the engine body 12.

The turbofan engine 10 is equipped with various engine accessories such as a fuel control unit, a fuel pump, an ignition unit, and a plurality of heat exchangers although the engine accessories are not shown in the drawings.

The turbofan engine 10 is also provided with a nacelle that surrounds the engine body 12 and the fan 13, and a core cowl (not shown) that surrounds the engine body 12 on an inner side of the nacelle although the nacelle and the core cowl are not shown in the drawings. The nacelle is provided continuously to a rear side of an air inlet 14 for introducing air. A bypass flow path is formed between the nacelle and the core cowl, and air discharged from the fan 13 flows through the bypass flow path.

The pylon 15 is a structural member that is provided on the main wing. The pylon 15 includes a box-shaped pylon body 151 that extends longitudinally, a plurality of struts that connect the pylon body 151 with the engine body 12, and a fairing 152 that covers the pylon body 151 and the struts. The struts are not shown in the drawings.

Various pipes such as fuel, hydraulic, and engine bleed air pipes (utility pipes), electric lines, or the like are accommodated in an inner portion of the pylon body 151.

The engine accessories of the turbofan engine 10 and pipes or the like accompanying the engine accessories (referred to as accessories below) are installed around the engine body 12 and the fan 13 on the inner side of the nacelle. Some of the accessories are provided on the pylon body 151, and the others of the accessories are provided on the outer periphery of the engine body 12 or the fan 13.

In the present embodiment, an engine oil cooler 17 and a precooler 18 are provided on the pylon body 151.

The engine oil cooler 17 is suspended from a lower surface of the pylon body 151 and thereby supported on a front side of the pylon body 151.

The precooler 18 is suspended from the lower surface of the pylon body 151 behind the engine oil cooler 17.

The utility pipes are arranged around the engine oil cooler 17 and the precooler 18.

The engine oil cooler 17 is a heat exchanger that cools engine oil used in the engine body 12 by using air flowing out of the fan 13 as a heat source (cold source).

The precooler 18 is a heat exchanger that cools extracted steam from the engine body 12 by using the air flowing out of the fan 13 as a heat source. Since it is difficult to use the high-temperature and high-pressure engine extracted steam directly as a heat source for an onboard air-conditioner or the like, the engine extracted steam is cooled by the precooler 18, and then used for air-conditioning or the like.

Each of the engine oil cooler 17 and the precooler 18 has a pipe that is connected to the engine body 12. In order to avoid damage to the engine oil cooler 17 and the precooler 18 with large vibration transmitted thereto from the engine body 12 through the pipes, a flexible hose that damps vibration is used for the pipes, or a vibration damping mechanism is provided in the pipes.

As described below, an intake duct 171 of the engine oil cooler 17 is connected to an intake port frame 21 that is provided on the engine body 12.

The intake port frame 21 formed in a rectangular annular shape is erected on an engine case 12A that is a case of the engine body 12. The intake port frame 21 forms an intake port for the air flowing out of the fan 13.

The intake port frame 21 and the intake duct 171 form a flow path that guides the air flowing out of the fan 13 to a plate-fin type body 170 of the engine oil cooler 17.

An exhaust duct 173 is connected to the body 170.

In order to reduce the vibration transmitted to the engine oil cooler 17 from the engine body 12 through the intake port frame 21, the intake duct 171 has a vibration damping section 172 that is formed in a bellows shape at least partially in a length direction. The vibration damping section may have any form, and a plurality of flange pipes may be continuously provided to constitute the vibration damping section.

The present embodiment relates to mounting the turbofan engine 10 to the pylon 15 that is a structural member on an airframe side.

The turbofan engine 10 is mounted when a newly-designed aircraft is manufactured, when a re-engined aircraft is manufactured, or at the time of engine replacement due to an engine defect or the like.

When the turbofan engine 10 is mounted, the nacelle and a fairing are opened to an outer side about a hinge that is longitudinally provided in an upper portion of each of the nacelle and the fairing. The pylon body 151 is thereby exposed.

The turbofan engine 10 placed on a hand truck 19 is carried to a position below the pylon body 151.

The turbofan engine 10 is lifted a little from the hand truck 19 by suspending the turbofan engine 10 from the pylon 15. The turbofan engine 10 is then fastened to the pylon body 151 and the struts of the pylon by fasteners. At this time, a work space is required into which the fasteners and fastening tools can be inserted, and in which the tools can be moved.

The engine oil cooler 17 and the precooler 18 suspended from the pylon body 151, and the accessories provided on the engine body 12 (referred to as engine-side accessories 20 below) exist between a lower portion of the pylon body 151 and the outer periphery of the turbofan engine 10.

In the present embodiment, since the ratio of the diameter of the turbofan engine 10 to the diameter of the nacelle is larger than that of a typical case, an interval between the inner periphery of the nacelle and the outer periphery of the engine body 12 is small. A plurality of accessories are arranged in the small interval, so that the accessories are located close to each other. The upper limit of the diameter of the nacelle is determined based on limitations on ground clearance and since it is difficult to extend a main landing gear in order to avoid an increase in weight. Thus, it is difficult to widen the interval between the nacelle and the engine body 12.

Since the interval between the nacelle and the engine body 12 is small, an interval between the pylon 15 and the engine body 12 is also small. Therefore, a work of mounting the turbofan engine 10 to the pylon body 151 is performed by inserting the fasteners and the tools into a small space left between the accessories, and moving the tools.

Since the interval between the pylon 15 and the engine body 12 is small as described above, a lower portion of the engine oil cooler 17 is located close to the engine-side accessories 20. While a predetermined clearance is set therebetween after mounting the turbofan engine 10, a space equal to or larger than the clearance is required for handling the tools and the fasteners. Therefore, a space having a height H1 is ensured between the engine oil cooler 17 and the engine-side accessories 20 by suppressing the truck height of the hand truck 19.

Similarly, since a space equal to or larger than the clearance is also required for handling the tools and the fasteners between the precooler 18 and the engine-side accessories 20, a space having a height H2 is ensured therebetween by suppressing the truck height of the hand truck 19.

On the other hand, a space is left on a rear end side of the pylon body 151, and between the precooler 18 and the engine oil cooler 17 in an axial direction (the longitudinal direction) of the turbofan engine 10.

However, there is not a sufficient space required for the work on a front end side of the pylon body 151 since the intake duct 171 and the intake port frame 21 exist on the front end side.

However, a work space for handling the tools and the fasteners is required on the front end side of the pylon body 151.

Figure 2:
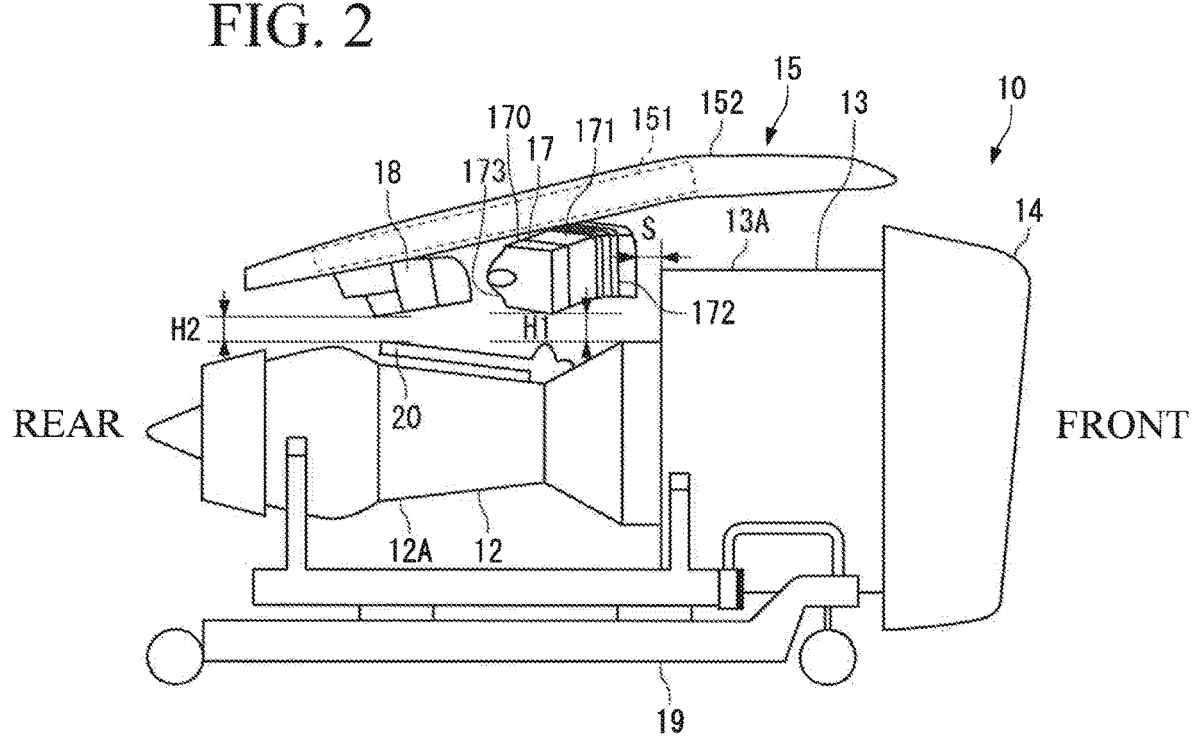
FIG. 2 is a view illustrating the turbofan engine (the left-side engine) that has not been mounted to the pylon yet (in a state in which an intake port frame is removed)

Therefore, the intake port frame 21 is configured to be attachable to and detachable from the engine body 12. When the turbofan engine 10 is mounted to the pylon 15, the intake port frame 21 is previously removed from the turbofan engine 10 as shown in FIG. 2. A space S is thereby generated, and the work of mounting the turbofan engine 10 is performed by using the space S.

Figure 3:
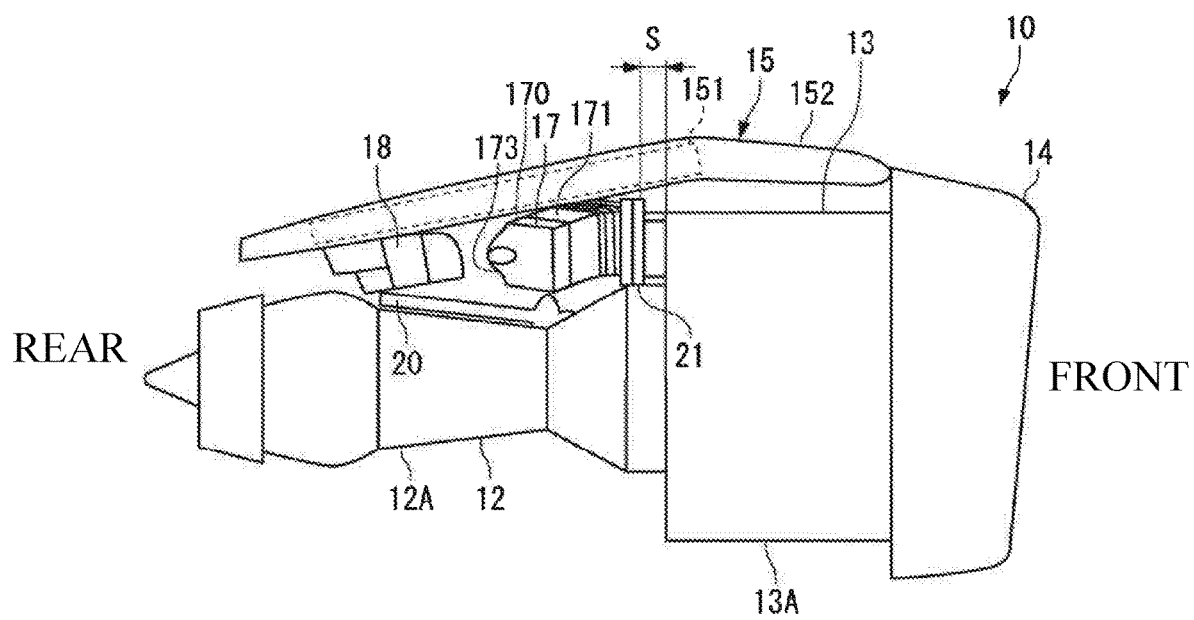
FIG. 3 is a view illustrating the turbofan engine mounted to the pylon.

As shown in FIG. 3, when the mounting of the turbofan engine 10 is completed, the intake port frame 21 is connected to a front end of the intake duct 171, and the intake port frame 21 is also attached to the engine case 12A.

As shown in FIGS. 4A and 4B, the intake port frame 21 includes an annular surrounding portion 211 that surrounds the front end of the intake duct 171, an annular projecting portion 212 that projects forward from the front end of the intake duct 171 and faces a rear end of a fan case 13A that is a case of the fan 13, an arm portion 215 that extends forward from the projecting portion 212, a fixing portion 213 that is located between the surrounding portion 211 and the projecting portion 212 and is fixed to the front end of the intake duct 171, and a fixing portion 214 that is fixed to the engine case 12A.

The dimension of the above space S corresponds to the total longitudinal dimension of the projecting portion 212 and the arm portion 215.

The intake port frame 21 is detachably fixed to the intake duct 171 by fastening the fixing portion 213 to the intake duct 171 by fasteners or the like.

The intake port frame 21 is also detachably fixed to the engine case 12A by fastening the fixing portion 214 to the engine case 12A by fasteners or the like.

When the mounting of the turbofan engine 10 is completed (FIG. 3), only the space S smaller than the longitudinal dimension of the intake port frame 21 is left between the rear end of the fan case 13A and the front end of the intake duct 171. Therefore, when the intake port frame 21 is tried to be inserted into the space S, the intake port frame 21 interferes with the intake duct 171 and the fan case 13A.

When the intake port frame 21 is integrally configured in an annular shape, it is necessary to arrange the intake port frame 21 ahead of the intake duct 171, and move the intake port frame 21 backward from the position in order to set the front end of the intake duct 171 on an inner side of the surrounding portion 211.

In this case, if the intake port frame 21 cannot be inserted into the space S from a lateral side, it is not possible to connect the intake port frame 21 to the intake duct 171 and attach the intake port frame 21 to the engine body 12.

Thus, the entire intake port frame 21 is divided into two parts to both sides of a center line L along a vertical direction as shown in FIG. 4A. The intake port frame 21 includes a left-side frame part 21L and a right-side frame part 21R.

The left-side frame part 21L and the right-side frame part 21R can be separated to a left side and a right side of the pylon 15 as indicated by an arrow in FIG. 4A, and are integrally attached so as to surround the intake duct 171.

Accordingly, even if the intake port frame 21 cannot be inserted into the space S, the front end of the intake duct 171 can be set on the inner side of the surrounding portion 211 by allowing the left-side frame part 21L and the right-side frame part 21R to access the intake duct 171 from the right and left sides of the pylon 15 and combining together the left-side frame part 21L and the right-side frame part 21R. The fixing portion 213 is fixed to the front end of the intake duct 171 in the above state, so that the intake port frame 21 is connected to the intake duct 171, and the projecting portion 212 and the arm portion 215 are arranged in the space S.

The fixing portion 214 is then fixed to the engine case 12A, so that the intake port frame 21 is attached to the engine body 12.

There exists no other accessory on the right and left sides of the intake port frame 21 connected to the intake duct 171. Therefore, when the nacelle and the core cowl on the inner side are opened, it is possible to remove the left-side frame part 21L and the right-side frame part 21R from the engine case 12A by accessing the outer periphery of the intake duct 171 without being disturbed by other accessories.

Therefore, it is not necessary to perform a work of removing other accessories at the time of removing the intake port frame 21 from the engine body 12.

Figure 5:
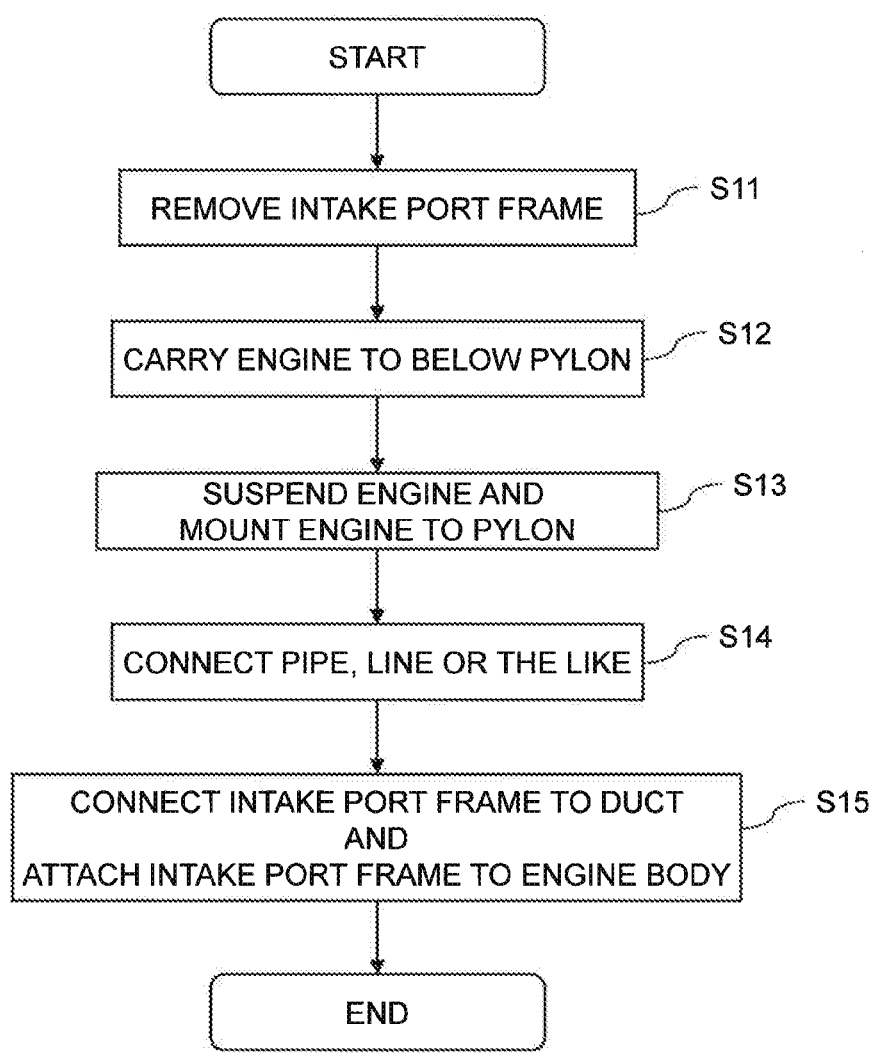
FIG. 5 is a view illustrating a procedure for mounting the engine to the pylon.

Next, a procedure for mounting the turbofan engine 10 to the pylon 15 is described by reference to FIG. 5.

First, the intake port frame 21 including the left-side frame part 21L and the right-side frame part 21R is removed from the engine body 12 of the turbofan engine 10 that is carried into a place where an airframe is installed (step S11).

However, if the turbofan engine 10 is carried in a state in which the frame parts 21L and 21R are not mounted to the engine body 12 and are separated from the turbofan engine 10, step S11 is not required.

Subsequently, the turbofan engine 10 is placed on the hand truck 19, and carried to a position below the pylon 15 (step S12).

The turbofan engine 10 is suspended from the pylon 15, and the mounting work is started (step S13).

If the intake port frame 21 has not been removed from the engine body 12 yet, the intake port frame 21 is removed before starting the engine mounting work.

The suspended turbofan engine 10 is fastened to the pylon body 151 and the pylon struts by the fasteners.

At this time, the space S (FIG. 2) between the front end of the intake duct 171 and the rear end of the fan case 13A is left between the pylon body 151 and the engine body 12 in addition to the space between the engine oil cooler 17 or the precooler 18 and the engine-side accessories 20, and the space between the engine oil cooler 17 and the precooler 18. The fastening work is performed by inserting the fasteners and the tools into the empty space, including the space S, between the pylon body 151 and the engine body 12.

Here, when the vibration damping section 172 of the intake duct 171 is formed in a bellows shape, it is possible to sufficiently ensure the space S by contracting the vibration damping section 172.

When the work of mounting the turbofan engine 10 to the pylon 15 is completed, a connection work for pipes, lines or the like to be provided in the turbofan engine 10 is performed (step S14).

The intake port frame 21 is connected to the intake duct 171 of the engine oil cooler 17, and attached to the engine body 12 at around the same time as step S14 (step S15).

In step S15, the left-side frame part 21L and the right-side frame part 21R surround the outer periphery of the intake duct 171 from the right and left sides, and the front end of the intake duct 171 is set on the inner side of the surrounding portion 211. By fastening the fixing portion 213 to the intake duct 171, the intake port frame 21 is connected to the intake duct 171.

Moreover, by fastening the fixing portion 214 to the engine case 12A, the intake port frame 21 is attached to the engine body 12.

As described above, since there exists no other accessory on the right and left sides of the intake port frame 21, it is not necessary to remove other accessories at the time of removing the intake port frame 21. Therefore, after the turbofan engine 10 is mounted to the pylon 15, it is only necessary to return only the intake port frame 21 to the engine body 12.

The mounting of the turbofan engine 10 is completed through the above steps.

Note that the frame parts 21L and 21R of the intake port frame 21 are previously removed from the engine body 12 when the turbofan engine 10 is removed from the pylon 15. The work of removing the turbofan engine 10 can be performed by using the generated space S (FIG. 3).

In accordance with the present embodiment, it is not necessary to perform the work of removing other accessories in order to form the space S by removing the intake port frame 21. Thus, it is only necessary to return the intake port frame 21 removed from the engine body 12 to the engine body 12 after mounting the turbofan engine 10.

If the space S is formed by removing the intake duct 171, the utility pipes arranged around the intake duct 171 need to be formed in a divided structure, and the intake duct 171 is removed after partially removing the utility pipes. In this case, it is necessary to perform a lot of returning works after mounting the turbofan engine 10. In the present embodiment, however, a minimum returning work is required.

Therefore, it is possible to mount the engine to the airframe with high work efficiency while ensuring a required work space.

The constitutions described in the aforementioned embodiment may be also freely selected or changed into other constitutions without departing from the gist of the present invention.

As long as the intake port frame 21 is divided into the left side and the right side of the pylon 15, the intake port frame 21 may be divided into, for example, four parts as well as the two parts. The intake port frame 21 may have any number of parts. For example, each of the left-side frame part 21L and the right-side frame part 21R may be divided into upper and lower parts. In this case, the respective parts can be attached to and detached from the intake duct 171 by upwardly or downwardly escaping from other members located on the right and left sides of the intake port frame 21.

As an accessory member to be removed for mounting the engine, an appropriate accessory member according to the position and the dimension of the required work space can be employed. An accessory member attached to the pylon as well as an accessory member attached to the engine may be employed as the accessory member.

In a case in which it is necessary to ensure a work space in the vertical direction, a vertically-extending accessory member connected to the duct can be removed before mounting the engine.

What is claimed is:

1. An aircraft comprising:
   an accessory member that constitutes an engine accessory, the accessory member being arranged between a pylon that is used for supporting an engine on an airframe and the engine, in an attached state to an attachment base member that is at least one of the pylon and the engine,
   wherein the accessory member includes a surrounding portion that surrounds at least an end portion of a tubular body connected to the accessory member, and
   a projecting portion that projects from the end portion of the tubular body,
   the entire accessory member including the surrounding portion and the projecting portion is divided into at least two separate parts so as to be separable to a left side and a right side of the pylon, and
   the accessory member is attachable to and detachable from the attachment base member by accessing an outer periphery of the tubular body from the left side and the right side of the pylon without removing another member.

2. The aircraft according to claim 1,
   wherein at least one portion of the tubular body is formed in a bellows shape.

3. The aircraft according to claim 1,
   wherein the engine is a turbofan engine including an engine body and a fan,
   wherein the end portion of the tubular body is facing the fan and is surrounded by the surrounding portion.

4. The aircraft according to claim 1,
   wherein the attachment base member is the engine.

5. An engine pylon of an aircraft that is used for supporting a turbofan engine including an engine body and a fan on an airframe of the aircraft,
   wherein the pylon supports two heat exchangers that are longitudinally arranged between the pylon and the engine body and use air flowing out of the fan as a heat source,
   the accessory member of the aircraft according to claim 1 is attached to the pylon,
   the heat exchanger arranged on a front side out of the two heat exchangers has the tubular body facing the fan, and
   at least a front end of the tubular body is surrounded by the surrounding portion.

6. A method for mounting an engine to an airframe of an aircraft by using the accessory member of the aircraft according to claim 1, the method comprising the steps of:
   mounting the engine to the pylon with the accessory member previously removed from the attachment base member; and
   surrounding the outer periphery of at least the end portion of the tubular body by the accessory member from the left side and the right side of the pylon and attaching the accessory member to the attachment base member after completing the mounting of the engine.

7. A method for manufacturing an aircraft through the respective steps in the method according to claim 6.

* * * * *